(12) United States Patent
Hecht et al.

(10) Patent No.: US 8,325,491 B2
(45) Date of Patent: Dec. 4, 2012

(54) FASTENING DEVICE FOR ELECTRONIC MODULES ON A SUPPORT RAIL

(75) Inventors: Franz Hecht, Weisendorf (DE); Martin Krauβ, Nürnberg (DE); Markus Müller, Nürnberg (DE); Raphael Paschka, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 299 days.

(21) Appl. No.: 12/517,394

(22) PCT Filed: Dec. 6, 2007

(86) PCT No.: PCT/EP2007/063440
§ 371 (c)(1),
(2), (4) Date: Jan. 12, 2010

(87) PCT Pub. No.: WO2008/068312
PCT Pub. Date: Jun. 12, 2008

(65) Prior Publication Data
US 2010/0134986 A1 Jun. 3, 2010

(30) Foreign Application Priority Data
Dec. 7, 2006 (DE) .................. 10 2006 057 766

(51) Int. Cl.
*H05K 7/14* (2006.01)
*H05K 7/02* (2006.01)
*H05K 5/00* (2006.01)
*H05K 7/00* (2006.01)

(52) U.S. Cl. ........ 361/801; 174/535; 174/541; 174/542; 361/732; 361/747; 361/756

(58) Field of Classification Search .................. 361/732, 361/747, 759, 801, 756, 809; 174/535, 541, 174/542
See application file for complete search history.

(56) References Cited

U.S. PATENT DOCUMENTS

| | | | |
|---|---|---|---|
| 5,049,094 A * | 9/1991 | Heng et al. ............... | 439/716 |
| 5,810,618 A * | 9/1998 | Barbier et al. ............ | 439/532 |
| 6,172,877 B1 * | 1/2001 | Feye-Hohmann et al. ... | 361/759 |
| 6,322,399 B1 * | 11/2001 | Hanning ................... | 439/717 |
| 6,425,770 B1 * | 7/2002 | Lostoski et al. .......... | 439/76.1 |
| 7,170,758 B1 * | 1/2007 | Hanning et al. .......... | 361/801 |
| 2005/0180814 A1 * | 8/2005 | Lehner et al. ............. | 403/326 |
| 2007/0008708 A1 * | 1/2007 | Hanning et al. .......... | 361/801 |

FOREIGN PATENT DOCUMENTS

| | | |
|---|---|---|
| DE | 3513762 A1 | 10/1986 |
| DE | 4210556 C2 | 10/1993 |
| DE | 29805494 U1 | 7/1998 |
| EP | 0373627 A1 | 6/1990 |

* cited by examiner

*Primary Examiner* — Timothy Thompson
*Assistant Examiner* — Sherman Ng

(57) ABSTRACT

A device for fastening an electronic module on a mounting rail and an electronic module fastened with the device on a mounting rail are provided. The device has a displaceable nose, encompassing a profile of the mounting rail together with a stationary nose provided on the back of a housing of the electronic module. The displaceable nose is configured as a clamping profile of a slide. By plugging in mechanical anchorings, the device is mounted in recesses of the housing on the back of the electronic module. The device has a spring mechanism provided to support the electronic module on the housing. A clamping force of the device on the mounting rail results from a force to the slide applied by the spring mechanism. An end of the slide opposite of the displaceable nose protrudes beyond the housing of the electronic module for the manual displacement of the displaceable nose.

13 Claims, 8 Drawing Sheets

FASTENING DEVICE FOR ELECTRONIC MODULES ON A SUPPORT RAIL

CROSS REFERENCE TO RELATED APPLICATIONS

This application is the US National Stage of International Application No. PCT/EP2007/063440 filed Dec. 6, 2007 and claims the benefit thereof. The International Application claims the benefits of German Patent Application No. 10 2006 057 766.3 DE filed Dec. 7, 2006. Both of the applications are incorporated by reference herein in their entirety.

FIELD OF INVENTION

The invention relates to a device for fastening an electronic module on a support rail and an electronic module that can be fastened on a support rail with such a device.

Such a device serves to fasten an electronic module, in particular an electrical installation device, on a support rail. The support rail is generally configured as a top-hat profile rail, on which the electronic module is fastened by hooking a nose of the fastening device behind an edge of the support rail and then latching the other nose in behind the other edge of the support rail.

BACKGROUND OF INVENTION

The known devices used as standard until now have two noses, at least one of which is displaceable, for fastening purposes, being used to latch an electronic module on a support rail. Depending on the type of device the electronic module is positioned on the upper or lower edge of the support rail and latched to the other edge by means of a swiveling movement. Some fastening devices, which generally have two displaceable noses, allow the electronic module to be positioned on the support rail from both sides.

A fast-fit fastening device for an electrical installation device that is snapped onto a top-hat profile rail is known from DE 298 05 494 U1, allowing latching onto the top-hat profile rail either around one or the other nose. The base of the installation device here has a recess, one wall of which has a fixed nose and the other wall of which has a displaceable nose that is pressed into the recess in a sprung manner.

A device for fastening an electronic module on a support rail is known from DE 42 10 556 C2. The electronic module has a displaceable nose, which encompasses the profile of the support rail in the mounted state.

SUMMARY OF INVENTION

An object of the invention is to specify a device for fastening an electronic module or an electronic module, which allows the fastening of the electronic module on a support rail in a simple and economical manner.

This object is achieved by a device for fastening an electronic module on a support rail,
  wherein the device has a displaceable nose, which together with a fixed nose provided on a rear face of a housing of the electronic module encompasses the profile of the support rail in the mounted state,
  wherein the displaceable nose is configured as a clamping profile of a slide,
  wherein the device can be mounted on the rear face of the electronic module by inserting mechanical anchors in recesses provided for this purpose on the housing,
  wherein the device has a spring mechanism, which is provided to be braced against the housing of the electronic module and which causes the slide to be subjected to a force, resulting in the clamping force of the device on the support rail, and
  wherein an end of the slide opposite the displaceable nose projects beyond the housing of the electronic module for manual displacement of the displaceable nose.

The object is also achieved by an electronic module as claimed in the claims.

The inventive insertion of the mechanical anchors in recesses provided for this purpose on the housing allows the device to be inserted into the housing of the electronic module by means of a simple mounting step. The slide mechanism is pretensioned by the spring mechanism integrated in the device. During mounting this engages in a punched out section of the housing, generating the pretensioning required for fastening on the support rail. The integration of the spring mechanism in the device means that no complex spring mounting is required. This simple and economical solution is suitable for module widths from 30 mm; it is possible to use a number of such devices for correspondingly wider and heavier components.

In one advantageous form of the embodiment the displaceable nose is embodied in such a manner that when the electronic module is fastened on the support rail the slide can be displaced counter to the force of the spring mechanism. This allows the electronic module to be mounted on the support rail in a simple manner by means of a swiveling movement after the fixed nose has been suspended on the support rail, as the slide is pushed downward by the embodiment of the displaceable nose during the swiveling movement and latches in behind the support rail.

In a further advantageous embodiment a latching nose is provided to fix the device in the housing in the non-mounted state, thereby ensuring that the device remains reliably on the housing.

In a further advantageous embodiment the end of the slide opposite the displaceable nose has an elongated opening. This allows the electronic module to be removed from the support rail by turning a screwdriver in the opening of the slide and then swiveling the housing away from the support rail.

In a further advantageous embodiment the device is made of plastic. This allows this embodiment to be produced in a particularly economical manner.

In a further advantageous embodiment the device has a metal coated surface. Such an embodiment can ensure an EMC-compatible structure for a sheet metal housing in particular.

BRIEF DESCRIPTION OF THE DRAWINGS

The invention is described and explained in more detail below with reference to the exemplary embodiments illustrated in the figures, in which.

DETAILED DESCRIPTION OF INVENTION

Figure 1:
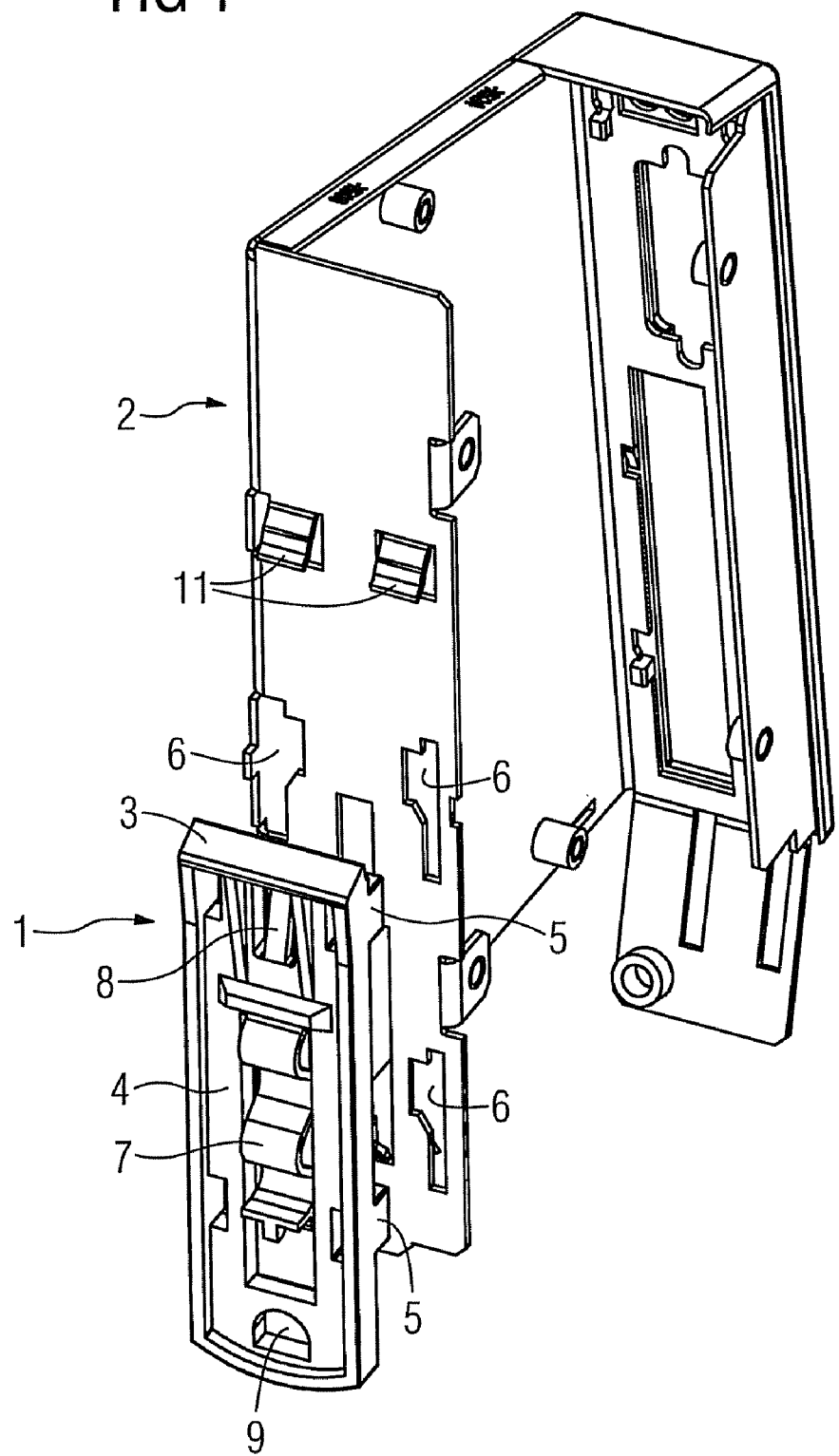
FIG. 1 shows an inventive device before mounting on the housing of the electronic module.

FIG. 1 shows an advantageous embodiment of the inventive device 1 and a section of a housing 2 of an electronic module 12 to be fastened on a support rail 10. The device 1 has a displaceable nose 3 configured as the clamping profile of a slide 4, which together with a fixed nose 11 provided on the rear face of the housing 2 encompasses the profile of the support rail 10 in the mounted state. The device also has a spring mechanism 7 for generating the required clamping force and a latching nose 8 and an elongated opening 9 in the slide 4, the function of which is described in the following figures. For mounting on the housing 2 the device 1 is inserted by means of the mechanical anchors 5 through the recesses 6 provided for this purpose in the housing and then displaced downward, as shown in FIGS. 2 and 3.

Figure 2:
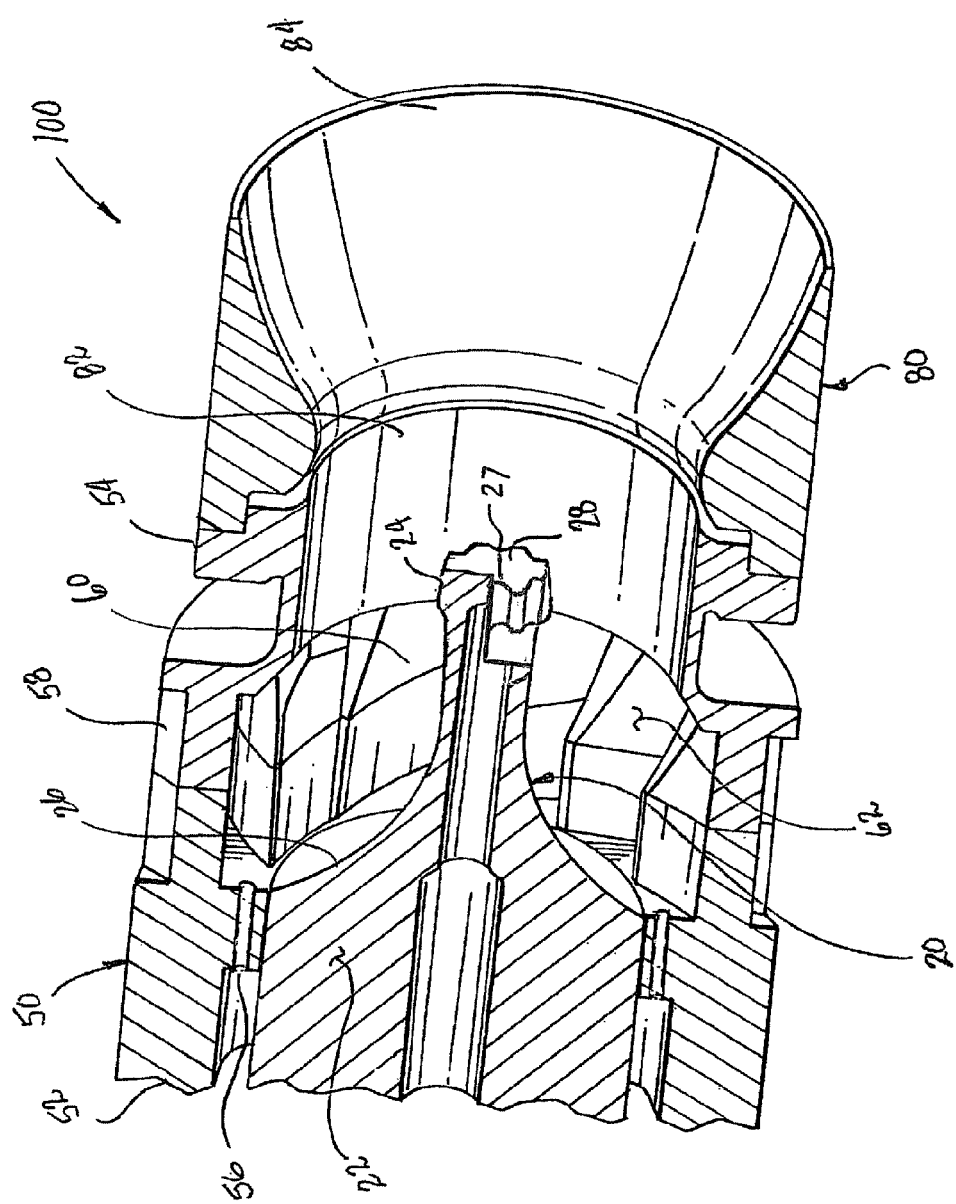
FIG. 2 shows the device from FIG. 1 during mounting.

FIG. 2 shows a rear view of the device from FIG. 1, which is inserted by means of the mechanical anchors 5 into the recesses 6 in the housing 2. The spring mechanism 7 engages with a punched out section of the housing 2 and due to the displacement of the device 1, see FIG. 3, generates the pretensioning required for fastening on the support rail 10.

Figure 3:
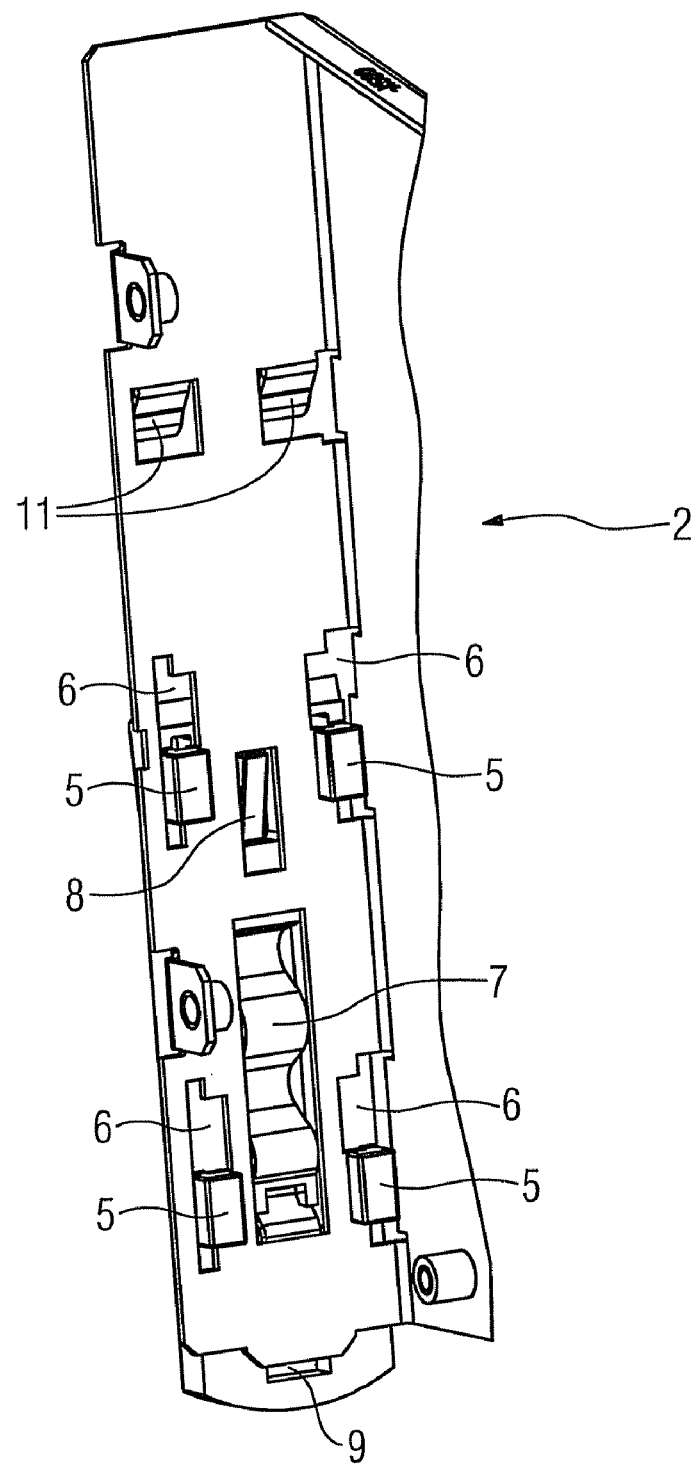
FIG. 3 shows the device from FIG. 1 and FIG. 2 after mounting.

FIG. 3 shows the same view as FIG. 2 of the device 1 mounted on the housing 2. Here the device 1 remains fixed on the housing 2 by means of the latching nose 8 and the mechanical anchors 5 and the spring 7 generates the required pretensioning.

Figure 4:
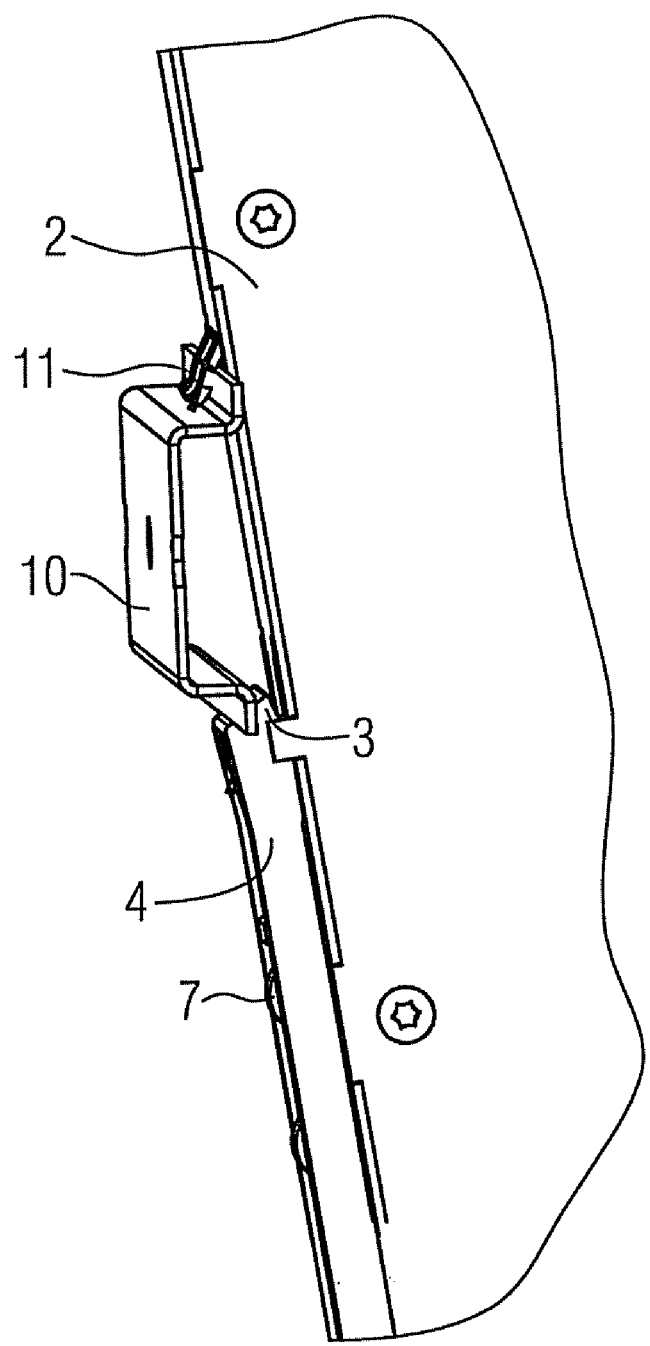
FIG. 4 shows the mounting of the housing on a support rail by means of the attached device.

FIG. 4 shows the mounting of the housing 2 on a support rail 10 by means of the device 1, of which only the upper part with the displaceable nose 3 is shown. The housing is now suspended by way of a fixed nose 11 configured as two tongues on the support rail 10 configured as a top-hat rail and mounted on the support rail 10 by means of a swiveling movement. In this process the slide 4 is pushed downward over its upper bevel, which forms the displaceable nose 3, and then latches in behind the top-hat rail 10 due to the spring force of the spring mechanism 7, see FIG. 5.

Figure 5:
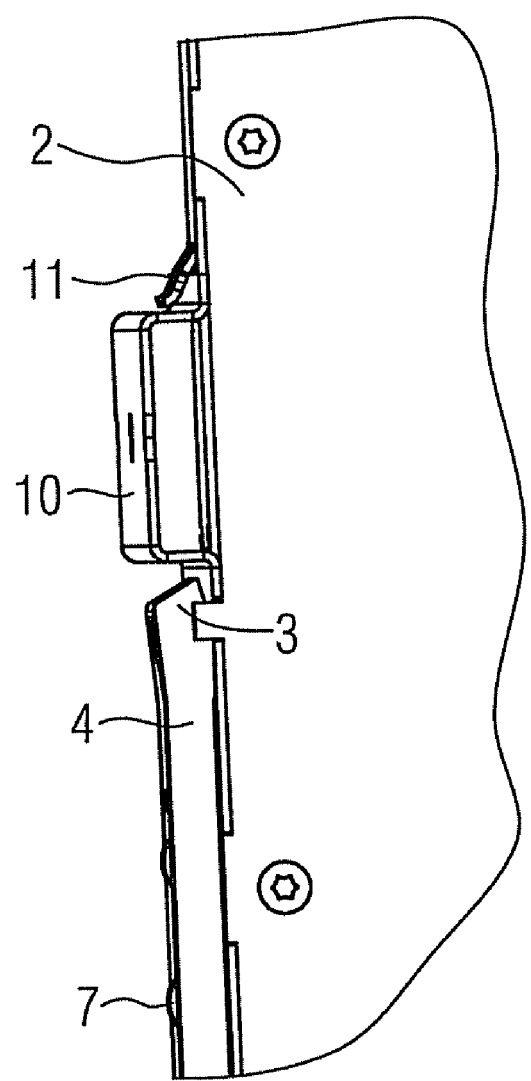
FIG. 5 shows the housing from FIG. 4 mounted on the support rail.

FIG. 5 shows the housing 2 from FIG. 4 mounted on the support rail 10. The force exerted by the spring mechanism 7 causes the slide 4 to latch in behind the top-hat rail 10 and together with the fixed nose 11 of the housing 2 the displaceable nose 3 encompasses the profile of the support rail 10.

Figure 6:
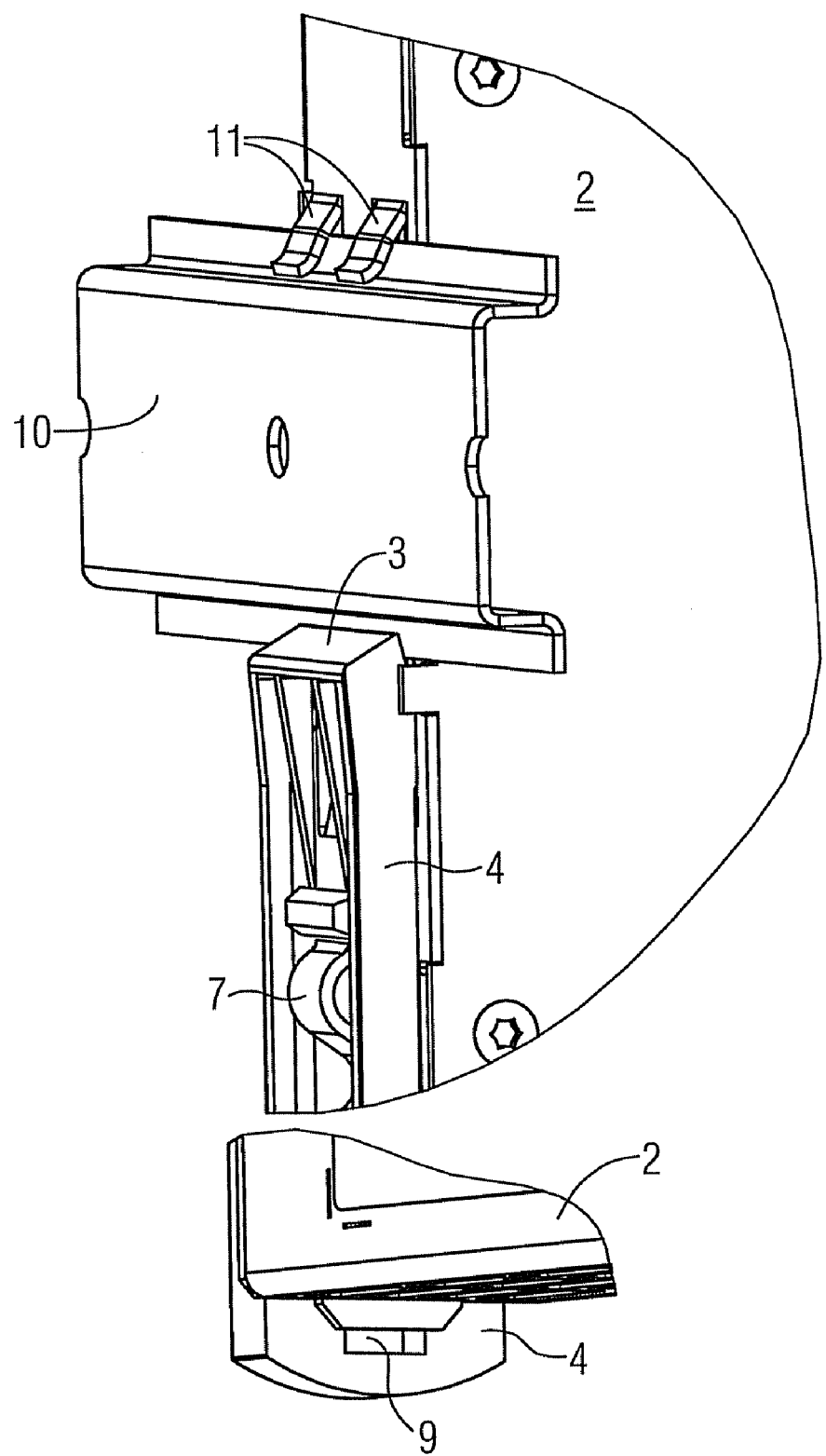
FIG. 6 shows a twin view of the mounted housing before removal from the support rail.

FIG. 6 shows a twin view of the mounted housing 2 before removal from the support rail 10. In the upper half the slide 4 is shown stopped by the spring 7, in which state the displaceable nose 3 together with the fixed nose 11 encompasses the profile of the top-hat rail 10. In the lower half the end of the slide 4 opposite the displaceable nose 3 and having an elongated opening 9 projects beyond the housing 2. This end is used for the manual displacement of the slide 4, so that the housing 2 can be removed from the top-hat rail 10 again by means of a swiveling movement, see FIG. 7. The elongated opening 9 allows the connection also to be released easily by turning a screwdriver.

Figure 7:
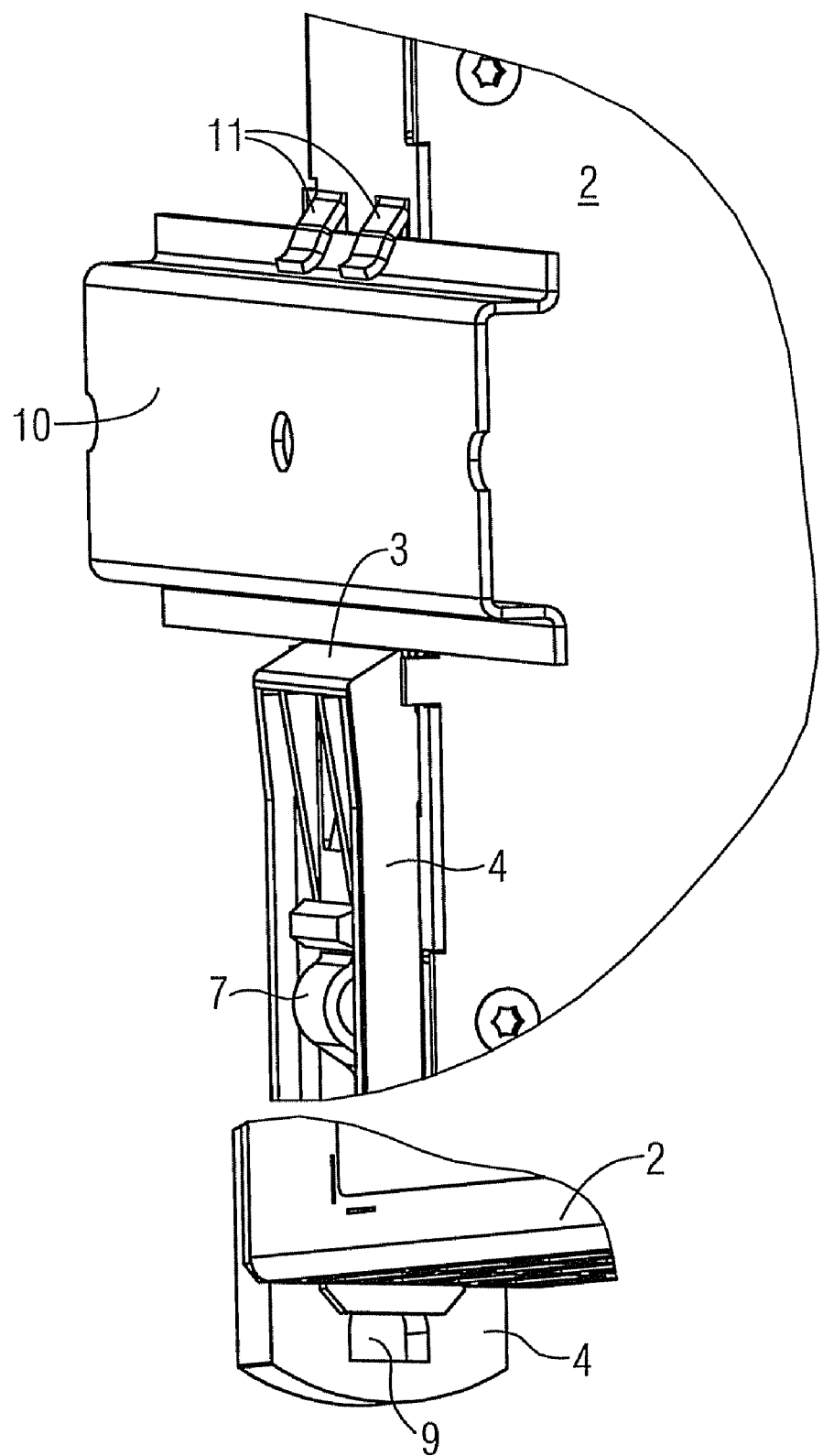
FIG. 7 shows the twin view from FIG. 6 during removal and FIG. 8 shows a view of an electronic module suspended on the support rail by means of the device.

FIG. 7 shows the twin view from FIG. 6 during removal. The slide 4 here is drawn down or turned using a screwdriver, thereby releasing the top-hat rail 10 again, so that the housing 2 can be removed by means of a swiveling movement.

Figure 8:
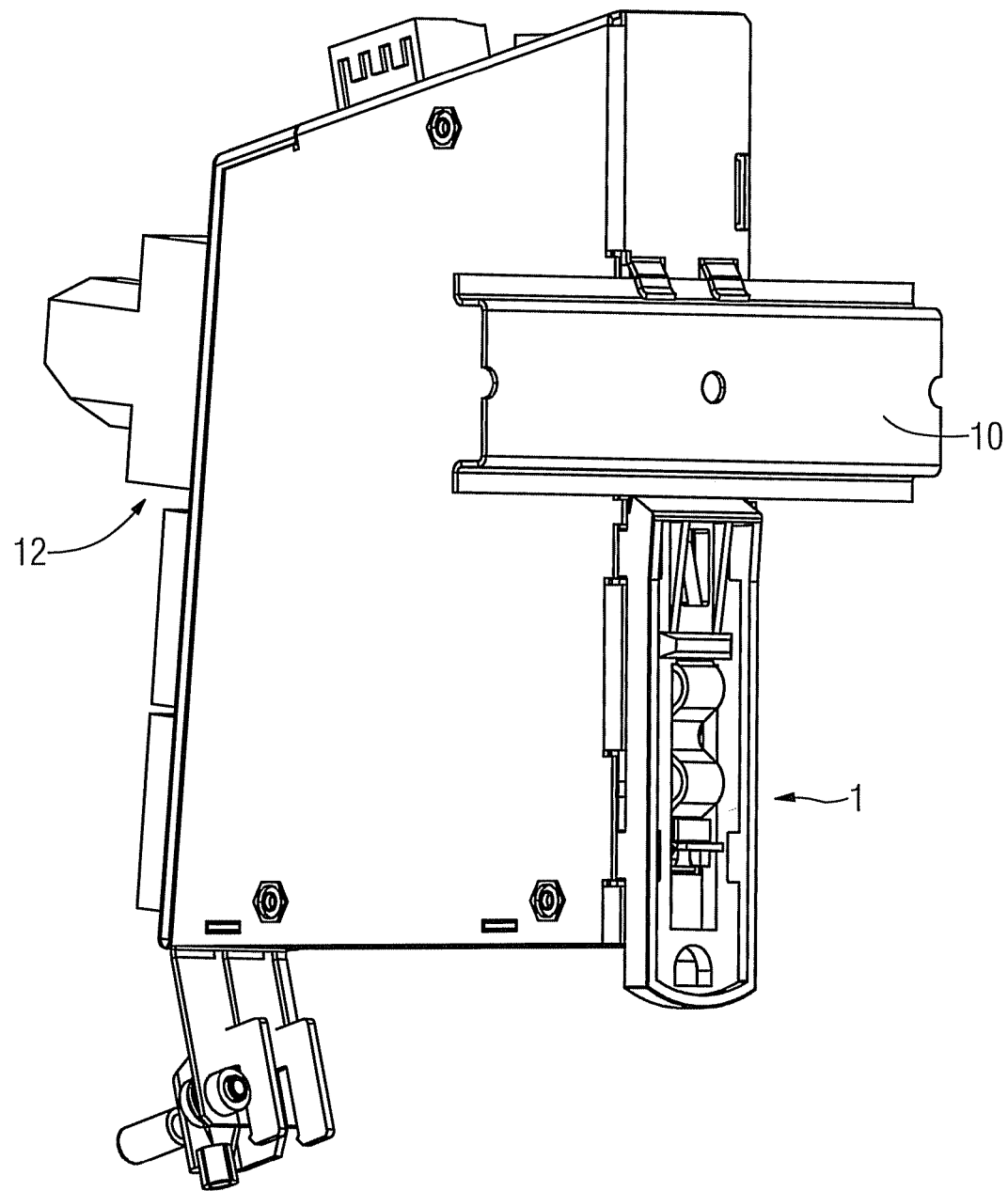

FIG. 8 shows a view of an electronic module 12 suspended on the support rail 10 by means of the device 1. The mounting of a metal or plastic housing 2 on a top-hat rail 10 can be realized simply and reliably with this economical device 1, which is advantageously made of plastic. The solution is suitable for module widths from 30 mm. It is possible to use a number of such mounting elements 1 for correspondingly wider and heavier components 12. The integration of the spring 7 in the plastic means that no complex spring mounting is required. In the case of a sheet metal housing 2 in particular this type of mounting in conjunction with a metal-coated surface of the device 1 ensures an EMC-compatible structure.

To summarize, the invention relates to a device for fastening an electronic module on a support rail and an electronic module that can be fastened on a support rail using such a device. The object of the invention is to specify a device for fastening an electronic module or an electronic module, which allows the fastening of the electronic module on a support rail in a simple and economical manner. This object is achieved by a device for fastening an electronic module on a support rail, wherein the device has a displaceable nose, which together with a fixed nose provided on a rear face of a housing of the electronic module encompasses the profile of the support rail in the mounted state, wherein the displaceable nose is configured as a clamping profile of a slide, wherein the device can be mounted on the rear face of the electronic module by inserting mechanical anchors in recesses provided for this purpose on the housing, wherein the device has a spring mechanism, which is provided to be braced against the housing of the electronic module and which causes the slide to be subjected to a force, resulting in the clamping force of the device on the support rail, and wherein an end of the slide opposite the displaceable nose projects beyond the housing of the electronic module for manual displacement of the displaceable nose.

The invention claimed is:

1. A device for fastening an electronic module on a support rail, comprising:
   a displaceable nose configured to encompass, together with a fixed nose provided on a rear face of a housing of the electronic module, a profile of the support rail;
   a slide, wherein the displaceable nose is configured as a clamping profile of the slide;
   mechanical anchors, wherein the device is mounted on the rear face of the electronic module by inserting the mechanical anchors in recesses on the housing of the electronic module;
   a spring mechanism configured to be braced against the housing of the electronic module and which causes the slide to be subjected to a force resulting in a clamping force of the device on the support rail, wherein
   an end of the slide opposite the displaceable nose projects beyond the housing of the electronic module for manual displacement of the displaceable nose, and
   the end of the slide has an elongated opening configured such that the slide is released from a stopped state by turning a screwdriver inserted into the opening.

2. The device as claimed in claim 1, wherein the displaceable nose is embodied such that, when the electronic module is fastened on the support rail, the slide is displaceable counter to the force of the spring mechanism.

3. The device as claimed in claim 1, further comprising:
   a latching nose configured to fix the device in the housing in a non-mounted state.

4. The device as claimed in claim 2, further comprising:
   a latching nose configured to fix the device in the housing in a non-mounted state.

5. The device as claimed in claim 1, wherein the device is made of plastic.

6. The device as claimed in claim 5, wherein the device has a metal-coated surface.

7. An electronic module for fastening on a support rail by a device, the device comprising:

a displaceable nose configured to encompass, together with a fixed nose provided on a rear face of a housing of the electronic module, a profile of the support rail;

a slide, wherein the displaceable nose is configured as a clamping profile of the slide;

mechanical anchors, wherein the device is mounted on the rear face of the electronic module by inserting the mechanical anchors in recesses on the housing of the electronic module;

a spring mechanism configured to be braced against the housing of the electronic module and which causes the slide to be subjected to a force resulting in a clamping force of the device on the support rail, wherein an end of the slide opposite the displaceable nose projects beyond the housing of the electronic module for manual displacement of the displaceable nose, and the end of the slide has an elongated opening configured such that the slide is released from a stopped state by turning a screwdriver inserted into the opening.

8. The electronic module as claimed in claim 7, wherein the displaceable nose is embodied such that, when the electronic module is fastened on the support rail, the slide is displaceable counter to the force of the spring mechanism.

9. The electronic module as claimed in claim 7, wherein the device further comprises a latching nose configured to fix the device in the housing in a non-mounted state.

10. The electronic module as claimed in claim 7, wherein the device is made of plastic.

11. The electronic module as claimed in claim 10, wherein the device has a metal-coated surface.

12. A device for fastening an electronic module on a support rail, comprising:

a displaceable nose configured to encompass, together with a fixed nose provided on a rear face of a housing of the electronic module, a profile of the support rail;

a slide, wherein the displaceable nose is configured as a clamping profile of the slide;

mechanical anchors, wherein the device is mounted on the rear face of the electronic module by inserting the mechanical anchors in recesses on the housing of the electronic module;

a spring mechanism configured to be braced against the housing of the electronic module and which causes the slide to be subjected to a force resulting in a clamping force of the device on the support rail in a stopped position, wherein the housing of the electronic module is secured to the support rail based on a manual displacement of the slide resulting from the displaceable nose being moved relative to the support rail and the fixed nose remaining stationary relative to the support rail.

13. The device as claimed in claim 12, further comprising:

an end of the slide opposite the displaceable nose projects beyond the housing of the electronic module for manual displacement of the displaceable nose, the end of the slide has an elongated opening configured such that the slide is released from a stopped state by turning a screwdriver inserted into the opening.

* * * * *